United States Patent
La et al.

(10) Patent No.: US 10,159,197 B2
(45) Date of Patent: Dec. 25, 2018

(54) METHOD FOR SURGICALLY OPERATING ON TREES

(71) Applicants: BRAINTREE BIOTECHNOLOGY INSTITUTE, Seoul (KR); Yong Joon La, Seoul (KR); Hye Young Yun, Seoul (KR)

(72) Inventors: Yong Joon La, Seoul (KR); Hye Young Yun, Seoul (KR)

(73) Assignee: BRAINTREE BIOTECHNOLOGY INSTITUTE, Seoul (KR)

( * ) Notice: Subject to any disclaimer, the term of this patent is extended or adjusted under 35 U.S.C. 154(b) by 210 days.

(21) Appl. No.: 14/907,268

(22) PCT Filed: Apr. 1, 2015

(86) PCT No.: PCT/KR2015/003228
§ 371 (c)(1),
(2) Date: Jan. 22, 2016

(87) PCT Pub. No.: WO2015/160116
PCT Pub. Date: Oct. 22, 2015

(65) Prior Publication Data
US 2017/0112072 A1    Apr. 27, 2017

(30) Foreign Application Priority Data
Apr. 16, 2014  (KR) .................. 10-2014-0045490

(51) Int. Cl.
*A01G 7/06*    (2006.01)
*A01G 17/18*   (2006.01)

(52) U.S. Cl.
CPC ............... *A01G 7/06* (2013.01); *A01G 17/18* (2013.01)

(58) Field of Classification Search
CPC ....... A01G 7/06; A01G 17/18; A01G 13/0237
See application file for complete search history.

(56) References Cited

U.S. PATENT DOCUMENTS 1,535,806 A * 4/1925 Blume ............... A01G 17/18
                                              47/8
1,548,963 A * 8/1925 Tindell .............. A01G 17/18
                                              47/8
(Continued)

FOREIGN PATENT DOCUMENTS

| KR | 10-2003-0019811 A | 3/2003 |
| KR | 10-2004-0055768 A | 6/2004 |
| KR | 10-2006-0073551 A | 6/2006 |

OTHER PUBLICATIONS

KR 2006-0073551 A machine translation (Year: 2006).*
(Continued)

*Primary Examiner* — Son T Nguyen
(74) *Attorney, Agent, or Firm* — Masuvalley & Partners

(57) ABSTRACT

The tree surgery method includes a decayed-tissue removing step of removing a decayed tissue of a cavity and exposing a solid woody tissue; an internal treating step of performing sterilization and insecticidal treatment on the woody tissue and drying the woody tissue; a protective layer forming step of coating the woody tissue with a protective agent to form a protective layer; a cambium exposing step of cutting out an edge of the cavity and exposing a cambium; a cavity filling step of filling the cavity on which the protective layer is formed with a urethane foam, and an artificial-tree-bark forming step of filling and coating an upper surface of the urethane foam with a tree bark material including a mixture of cork powder and silicone sealant to form an artificial tree bark. The tree bark material includes a mixture of colored silicone sealants allowing a color similar to real trees.

5 Claims, 4 Drawing Sheets

(56) References Cited

U.S. PATENT DOCUMENTS

| | | | | | |
|---|---|---|---|---|---|
| 1,590,923 | A | * | 6/1926 | Barber | A01G 17/18 47/8 |
| 1,799,699 | A | * | 4/1931 | Peets | A01G 17/18 156/98 |
| 1,799,700 | A | * | 4/1931 | Peets | A01G 17/18 47/8 |
| 1,844,372 | A | * | 2/1932 | Salathe, Jr. | A01G 17/18 47/8 |
| 2,147,865 | A | * | 2/1939 | Van Yahres | A01G 17/18 47/8 |
| 2,147,866 | A | * | 2/1939 | Van Yahres | A01G 17/18 47/8 |
| 3,286,400 | A | * | 11/1966 | Gruenewaelder | A01G 17/18 47/57.5 |
| 4,345,404 | A | * | 8/1982 | Benfer, Jr. | A01N 3/04 47/58.1 R |
| 2010/0260820 | A1 | * | 10/2010 | Kloczko | A01G 7/06 424/443 |
| 2011/0207213 | A1 | * | 8/2011 | Trauner | C09B 44/04 435/325 |

OTHER PUBLICATIONS

KR 2003-0019811 machine translation (Year: 2003).*
ISA/KR, International Search Report dated Jun. 19, 2015 in International Application No. PCT/KR2015/003228, total 4 pages with translation.

* cited by examiner

METHOD FOR SURGICALLY OPERATING ON TREES

RELATED APPLICATIONS

This application is the U.S. National Phase of and claims priority to International Patent Application No. PCT/KR2015/003228, International Filing Date Apr. 1, 2015, entitled METHOD FOR SURGICALLY OPERATING ON TREES which claims benefit of Korean Patent Application No. 10-2014-0045490 filed Apr. 16, 2014; both of which are incorporated herein by reference in their entireties.

TECHNICAL FIELD

The present invention relates to a tree surgery method for preventing decay of a cavity formed on a tree, and more particularly, to a tree surgery method for preventing decay of a cavity by filling urethane foam in a sterilized cavity and coating tree bark material including mixed silicone and cork powder on the filled urethane foam to form an artificial tree bark on the urethane foam.

BACKGROUND

A tree is subjected to large and small wounds due to an artificial factor such as pruning and transplanting, a meteorological factor such as typhoon and heavy snow, disease and insect pest, and the like.

A small wound on a large tree is generally healed by a self defense function of the tree.

However, when the wound on the tree is deep and large, the natural healing does not work well, and hence if it is left uncared, a woody tissue is decayed due to invasion of various germs through the wound, leading to development of a large cavity. This may threat the health of the tree, spoil the beauty, and cause an unexpected considerable damage on life and property from breakage of the tree in the vicinity of the cavity due to strong wind or the like.

For this reason, when a cavity is developed on a tree, a surgery is immediately performed on the tree to prevent a further decay of the cavity.

In such a conventional tree surgery method, a decomposed tissue in the cavity is removed with a sharp tool, before residual mycelium, spore, and harmful insects are removed by sterilization and insecticidal treatment. Thereafter, a preservative is applied, and the cavity is filled with urethane foam. Lastly, a surface treatment is performed by coating an epoxy resin.

However, the above tree surgery method is not effective from the aesthetic aspect due to a difference in colors between the tree and the artificial tree bark filled in the cavity. In addition, when exposed continuously to direct sunlight, as shown in FIG. 1(a), the artificial tree bark formed of the epoxy resin is cracked, oxidized, or degenerated, failing to serve as the tree bark, and hence as shown in FIG. 1(b), the urethane foam filled in the cavity is oxidized and degenerated, causing a decay of the cavity again.

DISCLOSURE

Technical Problem

The present invention has been made in view of the above aspects, and it is an object of the present invention to provide an artificial tree bark that has a color similar to that of a tree and that is free of oxidation and degeneration even when exposed continuously to direct sunlight.

SUMMARY

In order to solve the above-mentioned problems, a tree surgery method according to some embodiments of the present invention includes a decayed-tissue removing step of removing a decayed tissue of a cavity and exposing a solid woody tissue, an internal treating step of performing sterilization and insecticidal treatment on the woody tissue and drying the woody tissue, a protective layer forming step of coating the woody tissue with a protective agent to form a protective layer, a cambium exposing step of cutting out an edge of the cavity and exposing a cambium, a cavity filling step of filling the cavity on which the protective layer is formed with a urethane foam, and an artificial-tree-bark forming step of filling and coating an upper surface of the urethane foam with a tree bark material including a mixture of cork powder and silicone sealant to form an artificial tree bark. The tree bark material includes a mixture of a plurality of silicone sealants having different colors from each other to allow the tree bark material has a color similar to a color of a tree.

According to the preferred embodiments of the present invention, the tree bark includes a mixture of 100 weight ratio of the silicone sealant and 15 weight ratio to 25 weight ratio of the cork powder.

According to the preferred embodiments of the present invention, the coating a tree bark material includes coating the tree bark lower than the cambium to allow a callus tissue grown from the cambium to cover the artificial tree bark.

According to the preferred embodiments of the present invention, after the cavity filling step, a height of the urethane foam is adjusted to be lower than that of the cambium by 20 millimeters to 30 millimeters.

According to the preferred embodiments of the present invention, before the artificial-tree-bark forming step, a rough coating is performed on the upper surface of the urethane foam with the silicone sealant in order to prevent floating of the artificial tree bark.

According to the preferred embodiments of the present invention, before the cavity filling step, a waterproof treatment is performed by spreading the tree bark material of a predetermined height on a bottom surface of the cavity.

According to the preferred embodiments of the present invention, before spreading the tree bark material, a pelite is spread on the bottom surface of the cavity to improve drainage performance.

Advantageous Effects

According to some embodiments of the present invention, the following effects can be achieved.

(1) The formation of an artificial tree bark by coating the protective agent or the urethane foam filled in a cavity with a tree bark material including a mixture of the silicone sealant and the cork powder prevents oxidation and degeneration of the artificial tree bark even when exposed continuously to a direct sunlight.

(2) The tree bark material including a mixture of the silicone sealant and the cork powder is resistant to an external impact, is excellent in adhesion, water resist, durability, and flexibility, and is not contract with small change of the hardness hence no crack is developed semi-permanently after hardening, and the work process is simplified.

(3) The beauty of a tree can be preserved by forming a tree bark material having a color similar to that of the tree by mixing various colored silicone sealants.

(4) A texture of the tree bark material including the mixture of the silicone sealant and the cork powder is similar to that of a natural tree bark.

DETAILED DESCRIPTION

The above and other objects, features, advantages and technical and industrial significance of this invention will be better understood by reading the following detailed description of exemplary embodiments of the present invention. Exemplary embodiments of the present invention are described in detail below with reference to the accompanying drawings.

The purpose of a tree surgery is to restore or enhance health and beauty of a tree, and it is preferred to perform the tree surgery when a wound or a cavity is not too deep.

That is, when a bottom part of a tree stem is considerably decomposed or a cavity on a stem or a branch is large and deep, even if the tree surgery is performed, it is likely that the surgical site is broken and the tree is fallen by a strong wind, from which a good surgery result can hardly be expected.

Therefore, it is preferred to measure vitality of a tree 10 by using a vitality measurement apparatus (or tree vigor diagnosis apparatus) before performing the tree surgery.

Figure 1:
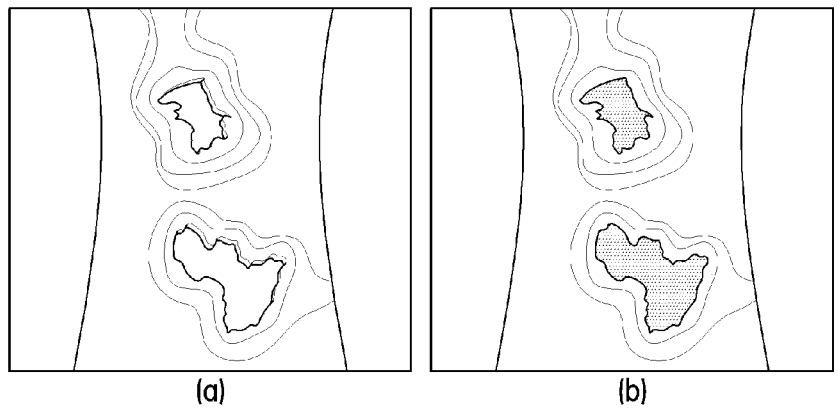
FIG. 1 is a schematic diagram of a tree having an operation by a conventional tree surgery method.
Figure 2:
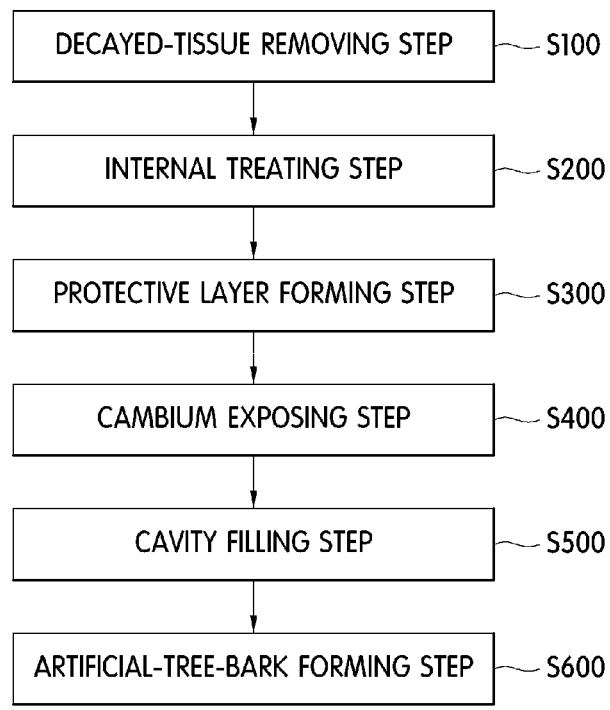
FIG. 2 is a flowchart of a tree surgery method according to the preferred embodiments of the present invention.

As shown in FIG. 2, a tree surgery method according to some embodiments of the present invention includes a decayed-tissue removing step (Step S100), an internal treating step (Step S200), a protective layer forming step (Step S300), a cambium exposing step (Step S400), a cavity filling step (Step S500), and an artificial-tree-bark forming step (Step S600).

The decayed-tissue removing step (Step S100) is a process of removing a decayed tissue, which is a decomposed part of the tree 10, and the process is slightly different between when a decomposition is ongoing and when the progress of the decomposition is stopped.

Firstly, when the decomposition of the woody tissue is ongoing, the inside of a cavity 100 is humid and a crumbly decayed tissue is seen. In this case, the decomposed tissue in the decayed tissue within reach is cleanly removed by using a tool (a chisel, a knife, a large driver, an adze, or the like). From a tissue out of reach or an uneven tissue, the decomposed tissue is removed, and at the same time, the moisture inside is removed, by spraying a compressed air.

At this time, it is preferred that an operator remove only the crumbly decayed tissue, leaving the solid woody tissue untouched. This is to stop expansion of the cavity 100 and to expedite healing of the cavity by the tree protecting a defensive barrier formed by its self-defensive power, suppressing advance of the decomposition and further protecting a callus tissue 16 formed on an edge of the cavity.

When the decomposition of the woody tissue is stopped, it indicates that there is no crumbly decayed tissue in the cavity 100 and the exposed woody tissue is solidly formed, hence foreign substances such as dusts or debris on the outer surface are removed and the moisture inside the cavity is removed by using a compressed air, instead of removing the woody tissue simply because the woody tissue is discolored.

The internal treating step (Step S200) includes a sterilization process of removing various germs and harmful insects inhabiting in the cavity from which the decayed tissue has been removed and a dry process of completely drying inside of the cavity.

The protective layer forming step (Step S300) is a step for coating the dried woody tissue with a protective agent and forming a protective layer by hardening the protective agent, where a thiophene paste is used as the protective agent. Such a protective layer protects the exposed woody tissue and prevents the direct contact between an urethane foam 110 filled in a upper woody part and the woody tissue from being brought into direct contact.

The cambium exposing step (Step S400) is a step for removing a tree bark 14 of a callus tissue curled inwardly along an edge of the cavity 100 on which the protective layer is processed, in which a cambium 12 is exposed by removing the tree bark 14 of the callus tissue curled at a position lower than the cambium located at a boundary between the tree bark of a stem having the cavity and the woody part by using a sharp knife, a chisel, an electric cutter, or the like.

This is to allow the callus tissue 16 grown from the cambium 12 after filling the cavity 100 to cover the entire urethane foam 110 from an edge of the urethane foam 110.

In the preferred embodiments, the thiophene paste is applied to a portion where the cambium 12 is exposed, to protect the exposed callus tissue 16 and to prevent the cambium 12 from being dried.

Figure 3:
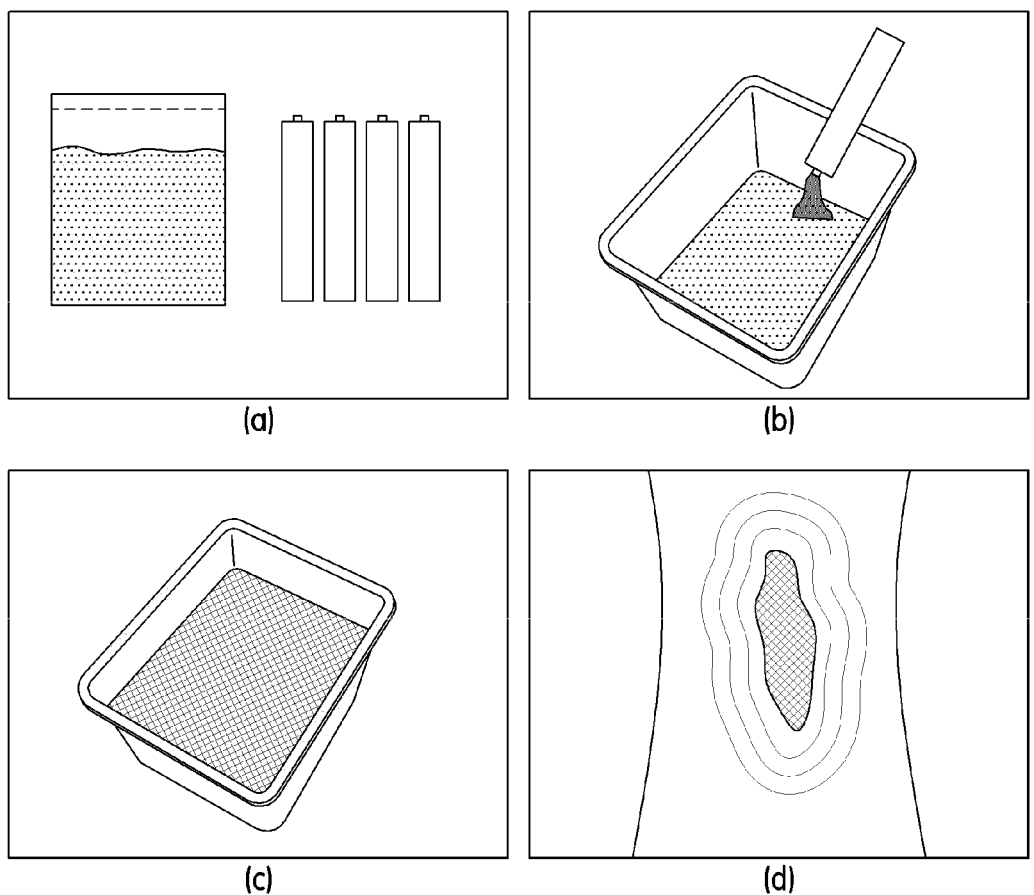
FIG. 3 is a schematic diagram illustrating a step-by-step process of producing a tree bark material according to the preferred embodiments of the present invention.

FIG. 3 is a schematic diagram illustrating a step-by-step process of producing a tree bark material according to the preferred embodiments of the present invention.

The artificial-tree-bark forming step (Step S600) is a step for coating an upper surface of the protective layer with a tree bark material 120 including a mixture of cork powder and silicone sealant and forming an artificial tree bark 20 by hardening the tree bark material 120.

Referring to FIG. 3, the silicone sealant and the cork powder, which are materials constituting the tree bark material 120, are prepared, and the silicone sealant and the cork powder are mixed to make paste. In the preferred embodiments, the tree bark material 120 includes a mixture of 100 weight ratio of the silicone sealant and 15 weight ratio to 25 weight ratio of the cork powder.

For example, the tree bark material 120 includes 500 milliliters of the silicone sealant and 90 grams to 100 grams of the cork powder.

The tree bark material 120 including the silicone sealant and the cork powder is resistant to an external impact and a direct sunlight, is excellent in adhesion, water resist, durability, and flexibility, and is not shrunken with small change in hardness after hardening.

In the preferred embodiments, the tree bark material 120 includes a plurality of silicone sealants having different colors from each other, such as brown, wood color, black, and the like, in order to obtain a color similar to the tree. After matching the color, the cork powder is mixed to produce the tree bark material 120.

The tree bark material 120 is applied to the upper surface of the protective layer and then hardened, to prevent water or moisture from permeating into the cavity 100 from outside. In some embodiments, the tree bark material 120 is applied to be lower than the exposed cambium 12 by about 5 millimeters to allow the callus tissue 16 grown from the cambium 12 to cover the artificial tree bark 20.

However, when the cavity 100 is deep, the inside of the cavity is filled with the urethane foam 110 in order to prevent the protective layer from being exposed.

Figure 4:
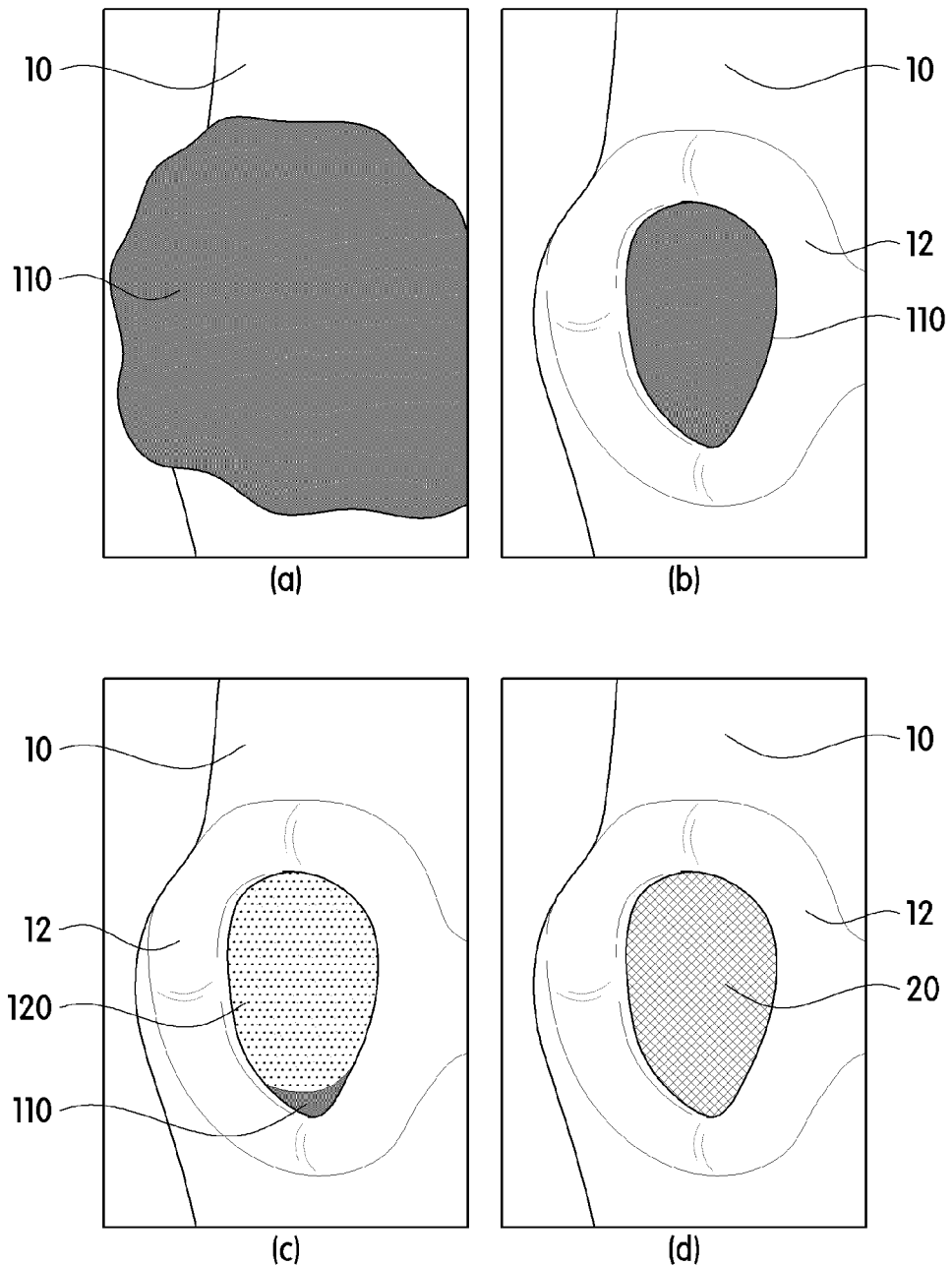
FIG. 4 is a schematic diagram of illustrating a step-by-step process of filling a cavity according to the preferred embodiments of the present invention.

FIG. 4 is a schematic diagram of illustrating a step-by-step process of filling a cavity according to the preferred embodiments of the present invention.

Referring to FIG. 4, in the step of filling the cavity 100 with the urethane foam 110 (Step S500), a masking tape (paper tape) is attached along an edge of the cavity including the exposed cambium 12, and the cavity 100 is covered with a vinyl sheet or a rubber sheet. Thereafter, the vinyl sheet or the rubber sheet is fastened firmly with a strap, a small hole is opened on the upper surface, the urethane foam 110 is sprayed, and then the urethane foam 110 is instantly expanded to fill the inside of the cavity 100. Lastly, after the urethane foam 110 is fully hardened, the vinyl sheet or the rubber sheet is removed, and the hardened urethane foam 110 is scraped to be lower than the cambium 12 by 20 millimeters to 30 millimeters by using, for example, a sharp knife.

Figure 5:
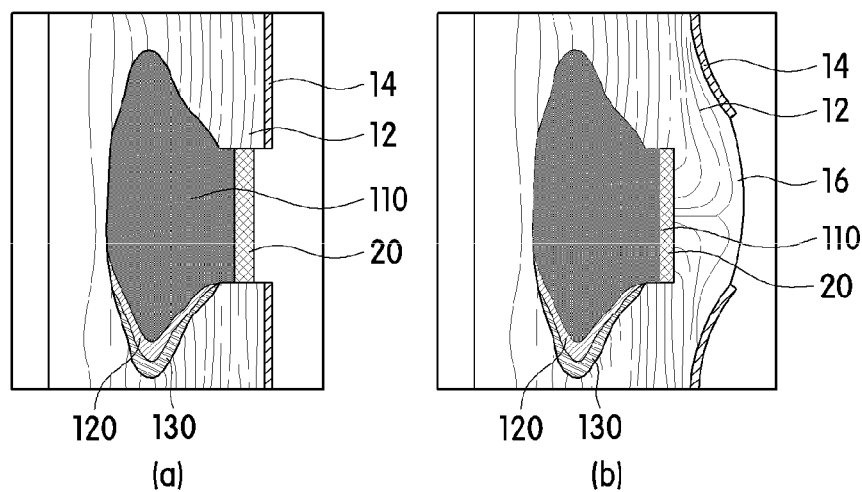
FIG. 5 is a schematic diagram of a tree before and after an operation by the tree surgery method according to the preferred embodiments of the present invention.

FIG. 5 is a schematic diagram of a tree before and after an operation by the tree surgery method according to the preferred embodiments of the present invention.

As shown in FIG. 5, the tree bark material 120 is applied to the urethane foam 110 with a thickness of 20 millimeters to 30 millimeters to form the artificial tree bark 20, which completes the tree surgery method according to some embodiments of the present invention.

At this time, before the artificial-tree-bark forming step (Step S600), the upper surface of the urethane foam 110 is rough coated thinly with the silicone sealant in order to prevent floating of the artificial tree bark 20.

Further, before filling the cavity with the urethane foam 110, a waterproof treatment is performed by applying the tree bark material 120 of a predetermined height on a bottom surface of the cavity 100 in order to prevent water or moisture from permeating up from the ground.

In the preferred embodiments, the tree bark material 120 is applied to the bottom surface of the cavity 100 after spreading a pelite (130) to improve drainage performance.

Figure 6:
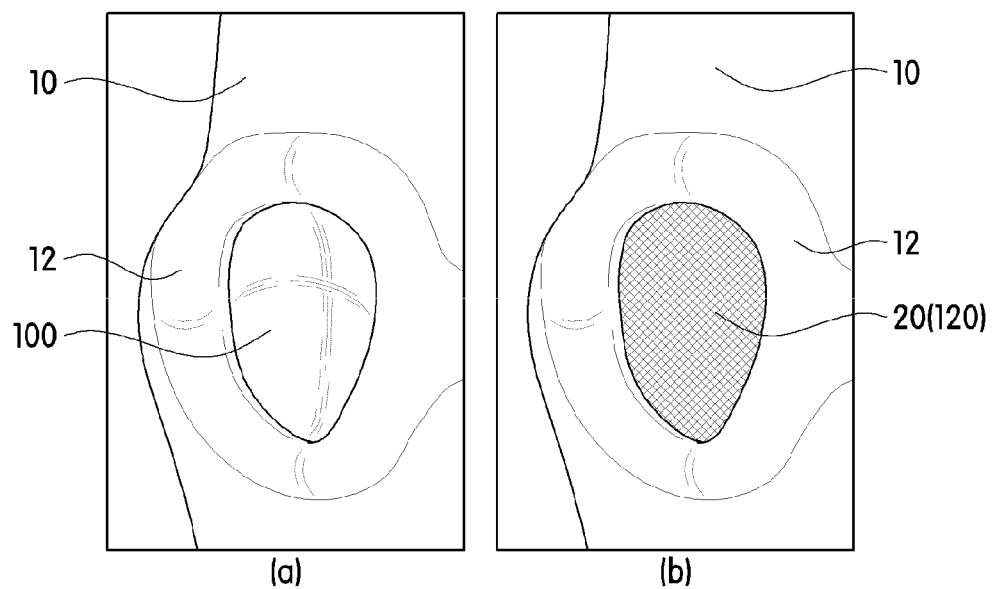
FIG. 6 is a schematic diagram of a tree having an operation by the tree surgery method according to the preferred embodiments of the present invention.

FIG. 6 is a schematic diagram of a tree having an operation by the tree surgery method according to the preferred embodiments of the present invention.

As shown in FIG. 6, in the tree 10 on which the tree surgery method according to some embodiments of the present invention is performed, the callus tissue 16 grown from the exposed cambium 12 by the natural healing power of the tree fills the cavity 100 while covering the artificial tree bark 20. Thereafter, the callus tissue 16 of the tree completely covers the urethane foam 110 and the artificial tree bark 20 with time, and hence it becomes hard to distinguish the tree on which the tree surgery is performed from a normal tree in appearance.

Therefore, the tree surgery method according to some embodiments of the present invention provides an artificial tree bark that is free of oxidation and degeneration even when exposed continuously to a direct sunlight by forming an artificial tree bark with an application of a tree bark layer on the urethane foam. Further, the tree surgery method according to some embodiments of the present invention preserves the beauty of a tree by forming a tree bark material having a color similar to that of the tree by mixing silicone sealants having various colors.

Although exemplary embodiments of the present disclosure have been described for illustrative purposes, those skilled in the art will appreciate that various modifications, additions and substitutions are possible, without departing from the characteristics of the disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A tree surgery method, comprising:
   removing a decayed-tissue by a step of removing the decayed tissue of a cavity and exposing a solid woody tissue;
   performing an internal treating step of sterilization and insecticidal treatment on the woody tissue and drying the woody tissue;
   forming a protective layer in a step of coating the woody tissue with a protective agent;
   exposing a cambium in a step of cutting out an edge of the cavity and-applying a thiophene paste to a portion where the cambium is exposed;
   filling the cavity on which the protective layer is formed in a step of filing the cavity with a urethane foam; and
   forming an artificial-tree-bark in a step of filling and coating an upper surface of the urethane foam with a tree bark material including a mixture of cork powder and silicone sealant to form an artificial tree bark, wherein
   the tree bark material includes a mixture of a plurality of silicone sealants having different colors from each other to allow the tree bark material has a color similar to a color of a tree;
   the tree surgery method further comprising:
   performing a pelite spreading step of spreading pelite on a bottom surface of the cavity to improve drainage performance before spreading the tree bark material; and
   performing a waterproofing step by waterproof treatment before the cavity filling step by spreading the tree bark material of a predetermined height on the bottom surface of the cavity, wherein the pelite and the tree bark material are covered only on the bottom of the inner surface of the cavity.

2. The tree surgery method according to claim 1, wherein the tree bark includes a mixture of 100 weight ratio of the silicone sealant and 15 weight ratio to 25 weight ratio of the cork powder.

3. The tree surgery method according to claim 1, wherein the coating with the tree bark material includes coating the tree bark lower than the cambium to allow a callus tissue grown from the cambium to cover the artificial tree bark.

4. The tree surgery method according to claim 1, further comprising, after the cavity filling step, an adjusting step of adjusting a height of the urethane foam lower than that of the cambium by 20 millimeters to 30 millimeters.

5. The tree surgery method according to claim 4, further comprising, before the artificial-tree-bark forming step, a first coating step of rough coating the upper surface of the urethane foam with the silicone sealant in order to prevent floating of the artificial tree bark.

* * * * *